Figure 1:
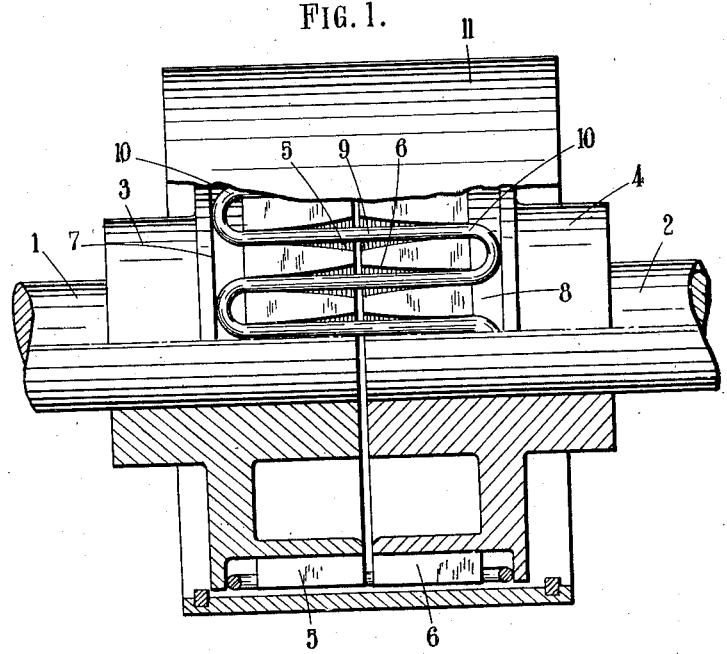

J. BIBBY.
POWER TRANSMISSION COUPLING.
APPLICATION FILED DEC. 14, 1920.

1,391,713.

Patented Sept. 27, 1921.

INVENTOR.
James Bibby
By Lawrence Langner
Attorney

UNITED STATES PATENT OFFICE.

JAMES BIBBY, OF LONDON, ENGLAND.

POWER-TRANSMISSION COUPLING.

1,391,713.

Specification of Letters Patent.   Patented Sept. 27, 1921.

Application filed December 14, 1920. Serial No. 430,709.

*To all whom it may concern:*

Be it known that I, JAMES BIBBY, a subject of the King of Great Britain, residing at London, in the county of Middlesex, England, have invented new and useful Improvements in Power - Transmission Couplings, of which the following is a specification.

This invention relates to couplings used to transmit power from a driving member to a driven member such as two co-axial lengths of shaft. In couplings of this kind it is often necessary to have a certain amount of flexibility to accommodate unavoidable eccentricity and lack of alinement of the shafts. It is also necessary to provide sufficiently strong transmitting or interconnecting means between the elements of the coupling to withstand all possible overload torques. In practice it is found that these overload torques may momentarily be of the order of 500 per cent. of the normal load owing to sudden accelerations, retardations, fly wheel effects, obstructions in the driven machines, and so forth, and hitherto it has been necessary to make so much allowance for these overloads that the coupling is unduly stiff for normal loads and has a shock absorbing capacity for such loads only a fraction of what it would be if the coupling were designed for normal loads only. It follows therefore that a flexible coupling which is able to damp the transmitting of torsional shocks has an additional advantage to that of flexibility. The chief object of the present invention is to provide a coupling having these advantages, possessing strength to transmit overload torques and full flexibility and resilience for normal and even sub-normal loads. Further advantages of the improved coupling are hereinafter referred to.

According to the present invention the coupling comprises elements on the driving and driven members respectively and flexible interconnecting means of grid form affording adequate flexibility for normal and even sub-normal loads and increasing resistance to distortion with increase of distortion due to increase of transmitted torque. Consequently within wide limits the strength of the coupling is not materially decreased by increase of load.

In the preferred constructional form of this compensating coupling the two elements thereof on the driving and driven members respectively are co-axial disks of equal size arranged side by side, and the interconnecting means consist of flexible rods extending longitudinally between them in normally alined grooves the walls of which are so shaped that the more the rods become deflected the shorter becomes their unsupported length. These rods are connected together by end pieces so as to constitute a continuous rod of zig-zag or grid form, for which purpose a stout wire may be bent to and fro. It will be understood that in order to insure a maximum unsupported length of the rods at no load and a decreasing unsupported length with increasing load, the alined gaps or grooves, in the coupling elements will be only sufficiently wide at their remote ends to house the ends of the rods but will increase in width progressively toward their abutting or adjoining ends. The curvature or flared formation of the side walls of these grooves is modified as compared with the natural curvature of the rods in their condition of maximum deflection, their curvature being sharper so that as the rods become deflected their unsupported lengths become less.

The invention will now be described more fully with reference to the preferred embodiment illustrated in the accompanying drawings.

Figure 2:
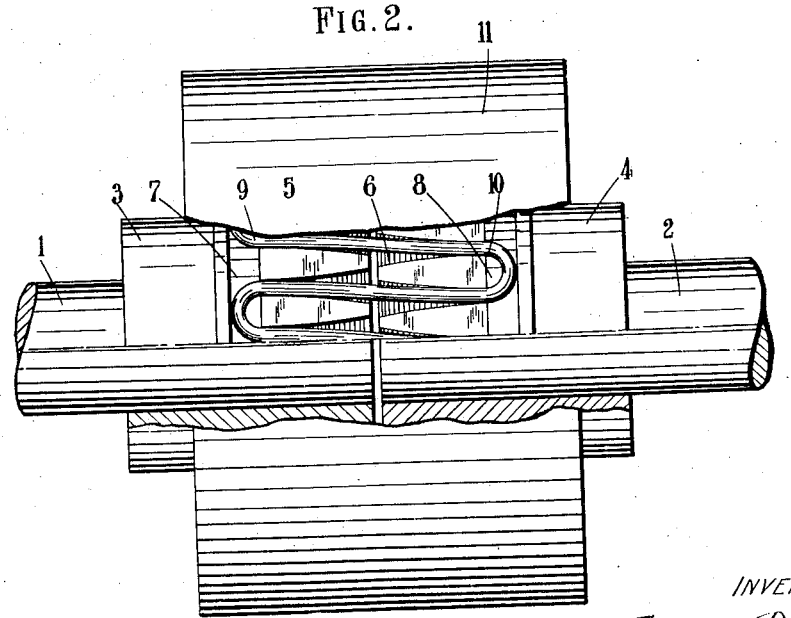

The upper half of Figure 1 is a longitudinal elevation partly broken away, the lower half being a longitudinal section. Fig. 2 is an exaggerated detail view.

1 and 2 are the driving and driven members respectively and 3 and 4 respectively are the coupling elements thereon. The peripheries of the elements 3 and 4 have normally alined axially directed grooves 5 and 6 equally spaced and communicating at their remote ends with circumferential channels 7 and 8. The interconnecting means between the elements 3 and 4 are constituted by the flexible rods 9 forming the parallel limbs of a grid-like spring steel wire. These rods 9 lie in the normally alined grooves 5 and 6 and the curved connecting pieces 10 lie in the channels 7 and 8. The grooves are just wide enough at their remote ends to accommodate the rods 9 and are flared inwardly, the side walls being curved as shown so that when power is being transmitted and the grooves become out of alinement, the unsupported lengths of the rods decrease proportionally with the deflection, as shown in Fig. 2. In other words, the shape of the side walls of the grooves is such that as the two coupling elements become angularly displaced more and more, so that the deflection of the rods 9 brings them more and more in contact with the side walls and the unsupported lengths of the rods become less and less and their bending moments reduced, the limit being attained when practically the full lengths are supported, beyond which the resistance will approach that opposed to shear. Under normal loads, however a considerable length of the rods will be unsupported and consequently there will be a great capacity to absorb shocks.

Further features of novelty incidental to the construction illustrated are of practical importance. It is to be noted that both coupling elements are practically identical and coöperate at their periphery with the interconnecting rods and thus produce their maximum effect owing to the maximum leverage of both elements as distinguished from existing types of coupling where one at least of the coupling elements is engaged at some distance inwardly from its periphery. Hence for the same torque-transmission this novel form of coupling requires a less diameter than existing forms.

Moreover, the transmission by way of the interconnecting grid produces no couple in a radial direction. Consequently no provision has to be made for restraining radial forces as in existing types of couplings, and only a light cylindrical casing 11 need be fitted to serve as a retainer of lubricant.

It will be seen that this coupling works equally well in either direction.

What I claim and desire to secure by Letters Patent is:—

1. A flexible shaft coupling comprising two coupling elements arranged side by side on the driving and driven shafts respectively and a grid-like interconnecting member having its parallel limbs extending longitudinally in normally alined grooves in said elements, the walls of said grooves being so shaped that the more the limbs become deflected by relative angular movement between the elements during torque transmission the less becomes their unsupported length.

2. A flexible shaft coupling comprising two coupling elements side by side on the driving and driven shafts respectively and having normally alined inwardly flaring grooves extending longitudinally, and a grid-like interconnecting member the parallel limbs of which lie in the aforesaid grooves.

3. A flexible shaft coupling comprising two coupling elements side by side on the driving and driven shafts respectively and having normally alined inwardly flaring grooves extending longitudinally in their peripheries and a spring steel stout wire in grid form the parallel limbs of which are housed in the aforesaid grooves.

4. A flexible shaft coupling comprising coupling elements side by side on the driving and driven shafts respectively and having peripheral axially directed and normally alined inwardly flaring grooves therein, a spring steel stout wire of grid form having its parallel limbs housed in said grooves and a light cylindrical casing inclosing said elements peripherally.

5. A flexible shaft coupling comprising coupling elements on the driving and driven shafts respectively and having peripheral axially directed and normally alined inwardly flaring grooves, a grid-like interconnecting member housed in said grooves, the walls of the latter being modified as compared with the natural curvature of the parallel limbs of said member in their maximum deflected condition so that as the limbs become deflected their unsupported length becomes less.

JAMES BIBBY.